US010805392B2

(12) United States Patent
Farmahini-Farahani et al.

(10) Patent No.: US 10,805,392 B2
(45) Date of Patent: Oct. 13, 2020

(54) DISTRIBUTED GATHER/SCATTER OPERATIONS ACROSS A NETWORK OF MEMORY NODES

(71) Applicant: Advanced Micro Devices, Inc., Sunnyvale, CA (US)

(72) Inventors: Amin Farmahini-Farahani, Sunnyvale, CA (US); David A. Roberts, Boxborough, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 430 days.

(21) Appl. No.: 15/221,554

(22) Filed: Jul. 27, 2016

(65) Prior Publication Data

US 2017/0048320 A1  Feb. 16, 2017

Related U.S. Application Data

(60) Provisional application No. 62/204,779, filed on Aug. 13, 2015.

(51) Int. Cl.
*G06F 15/16* (2006.01)
*H04L 29/08* (2006.01)

(52) U.S. Cl.
CPC .................. *H04L 67/1097* (2013.01)

(58) Field of Classification Search
CPC .................. H04L 43/16; H04L 41/06
USPC .................................. 709/217, 203
See application file for complete search history.

(56) References Cited

U.S. PATENT DOCUMENTS

| 6,105,080 A * | 8/2000 | Holt | G06F 13/28 710/26 |
| 6,665,746 B1 * | 12/2003 | Liong | G06F 13/28 710/22 |
| 2002/0144027 A1 * | 10/2002 | Schmisseur | G06F 13/28 710/22 |
| 2003/0033477 A1 * | 2/2003 | Johnson | G06F 3/0601 711/114 |

(Continued)

OTHER PUBLICATIONS

Kim, Gwangsun et al., "Memory-centric System Interconnect Design with Hybrid Memory Cubes", Proceedings of the 22nd International Conference on Parallel Architectures and Compilation Techniques, Sep. 7-11, 2013, pp. 145-155, IEEE, Edinburgh, Scotland.

(Continued)

*Primary Examiner* — Duyen M Doan
(74) *Attorney, Agent, or Firm* — Volpe and Koenig, P.C.

(57) ABSTRACT

Devices, methods, and systems for distributed gather and scatter operations in a network of memory nodes. A responding memory node includes a memory; a communications interface having circuitry configured to communicate with at least one other memory node; and a controller. The controller includes circuitry configured to receive a request message from a requesting node via the communications interface. The request message indicates a gather or scatter operation, and instructs the responding node to retrieve data elements from a source memory data structure and store the data elements to a destination memory data structure. The controller further includes circuitry configured to transmit a response message to the requesting node via the communications interface. The response message indicates that the data elements have been stored into the destination memory data structure.

20 Claims, 15 Drawing Sheets

(56) References Cited

U.S. PATENT DOCUMENTS

| | | | |
|---|---|---|---|
| 2003/0126348 A1* | 7/2003 | Jung | G06F 13/1657 710/314 |
| 2004/0064600 A1* | 4/2004 | Lee | G06F 3/0626 710/22 |
| 2005/0235072 A1* | 10/2005 | Smith | G06F 13/1642 710/22 |
| 2006/0136613 A1* | 6/2006 | Morozumi | G06F 11/1658 710/22 |
| 2009/0046533 A1* | 2/2009 | Jo | G06F 13/1694 365/230.03 |
| 2011/0153983 A1* | 6/2011 | Hughes | G06F 9/30018 712/22 |
| 2014/0181427 A1 | 6/2014 | Jayasena et al. | |
| 2015/0052267 A1* | 2/2015 | Egi | G06F 13/28 710/22 |
| 2015/0261720 A1* | 9/2015 | Kagan | G06F 13/4221 710/308 |

OTHER PUBLICATIONS

Carter, John et al., "Impulse: Building a Smarter Memory Controller", Fifth International Symposium on High-Performance Computer Architecture, Jan. 9-13, 1999, pp. 70-79, IEEE, Orlando, FL, U.S.A.

Hybrid Memory Cube Consortium, "Hybrid Memory Cube Specification 2.0", Nov. 2014, 125 pgs., Rev. 2.0, Altera Corporation, ARM Ltd., International Business Machines Corporation, Micron Technology, Inc., Open-Silicon, Inc., Samsung Electronics Co., Ltd., SK Hynix, Inc., and Xilinx, Inc., USA (Available at: http://hybridmemorycube.org/files/SiteDownloads/HMC-30G-VSR_HMCC_Specification_Rev2.0_Public.pdf).

* cited by examiner

DISTRIBUTED GATHER/SCATTER OPERATIONS ACROSS A NETWORK OF MEMORY NODES

CROSS REFERENCE TO RELATED APPLICATION

This application claims priority from U.S. Provisional Application No. 62/204,779 filed on Aug. 13, 2015, which is incorporated by reference as if fully set forth herein.

GOVERNMENT RIGHTS

This invention was made with government support under Prime Contract Number DE-AC52-07NA27344, Subcontract No. B608045, awarded by the United States Department of Energy. The government has certain rights in the invention.

TECHNICAL FIELD

The disclosed embodiments are generally directed to computer memory, and in particular, to networked memory nodes.

BACKGROUND

Networked memory nodes typically load and store data to and from memory by issuing addresses and control commands on a per-data-item (e.g., per-byte, word, cache line, page, etc.) basis. This is done by transmitting a separate address and control command to be transmitted from the source node to memory for each access, even in cases where the sequence of accesses follows a pre-defined pattern (e.g., a sequential stream). This transmission of addresses and commands consumes bandwidth and power and may introduce performance overhead in cases where the address and command bandwidth becomes a bottleneck. Further, issuing addresses and control commands on a per-data-item basis may limit opportunities to optimize memory accesses and data transfers.

SUMMARY OF EMBODIMENTS

Some embodiments provide a method for storing data into non-contiguous memory locations. Receiver circuitry of a responding memory node receives a gather request message from a requesting memory node, the gather request message indicating that the responding memory node shall retrieve data elements from non-contiguous locations in a source memory array and store the data elements in contiguous locations in a destination memory vector. Retrieval circuitry of the responding memory node retrieves the data elements from the non-contiguous locations in the source memory array. Storing circuitry of the responding memory node stores the data elements in contiguous locations in the destination memory vector. Transmitter circuitry of the responding memory node transmits, to the requesting memory node, a gather response message indicating that the data elements have been stored into the destination vector.

Some embodiments provide a method for retrieving data from non-contiguous memory locations. Receiver circuitry of a responding memory node receives a scatter request message from a requesting memory node, the scatter request message indicating that the responding memory node shall retrieve data elements from contiguous locations in a source memory vector and store the data elements in non-contiguous locations in a destination memory array. Retrieval circuitry of the responding memory node retrieves the data elements from the contiguous locations in the source memory vector. Storing circuitry of the responding memory node stores the data elements in non-contiguous locations in the destination memory array. Transmitter circuitry of the responding memory node transmits, to the requesting memory node, a scatter response message indicating that the data elements have been stored into the destination memory array.

Some embodiments provide a responding memory node. The responding memory node includes a communications interface with circuitry configured to communicate with at least one other memory node and a controller. The controller includes circuitry configured to receive a request message from a requesting node via the communications interface, the request message indicating that the responding node shall retrieve data elements from a source memory data structure and store the data elements to a destination memory data structure; retrieve the data elements from the source memory data structure; store the data elements to the destination memory data structure; and transmit a response message to the requesting node via the communications interface, the response message indicating that the data elements have been stored into the destination memory data structure.

BRIEF DESCRIPTION OF THE DRAWINGS

A more detailed understanding may be had from the following description, given by way of example in conjunction with the accompanying drawings wherein.

DETAILED DESCRIPTION

Some implementations provide a method for retrieving data from non-contiguous memory locations and storing data into contiguous memory locations. A responding memory node which contains a source memory array receives a gather request message from a requesting memory node. The gather request message instructs the responding memory node to retrieve data elements from non-contiguous locations in the source memory array and store the data elements in contiguous locations in a destination memory vector. The responding node transmits, to the requesting memory node, a gather response message indicating that the data elements have been stored into the destination vector. The source memory array can be located entirely on the responding memory node.

Some implementations provide a method for retrieving data from contiguous memory locations and storing data into non-contiguous memory locations. A responding memory node receives a scatter request message from a requesting memory node. The scatter request message instructs the responding memory node to retrieve data elements from contiguous locations in a source memory vector and store the data elements in non-contiguous locations in a destination memory array. The responding memory node transmits, to the requesting memory node, a scatter response message indicating that the data elements have been stored into the destination memory array. The destination memory array can be located entirely on the responding memory node.

Some implementations provide a responding memory node. The responding memory node includes a memory; a communications interface comprising circuitry configured to communicate with at least one other memory node; and a controller. The controller includes circuitry configured to receive a request message from a requesting node via the communications interface. The request message instructs the responding node to retrieve data elements from a source memory data structure and store the data elements to a destination memory data structure. The controller includes circuitry configured to transmit a response message to the requesting node via the communications interface. The response message indicates that the data elements have been stored into the destination memory data structure.

Figure 1:
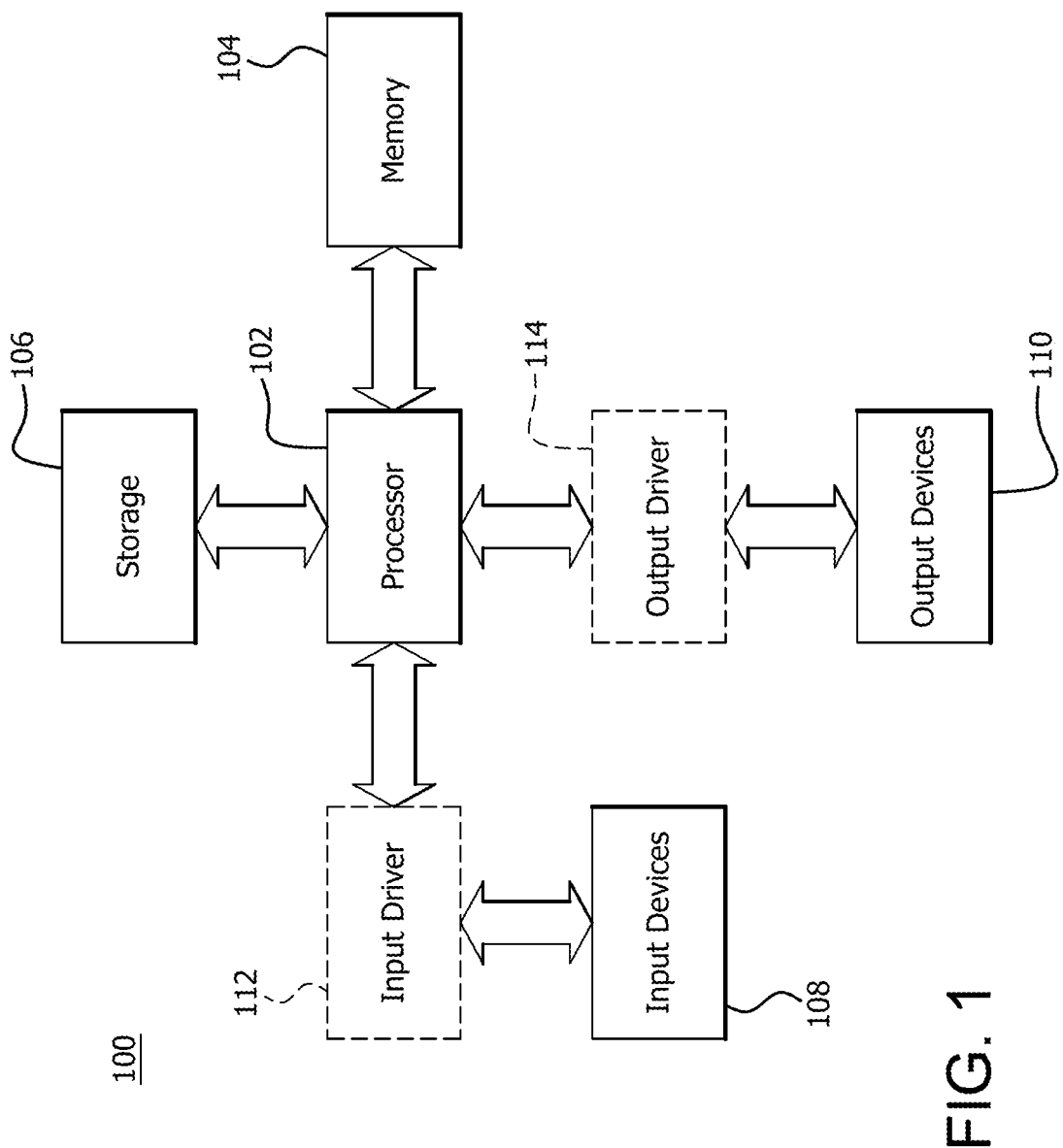
FIG. 1 is a block diagram of an example device in which one or more disclosed embodiments may be implemented.

FIG. 1 is a block diagram of an example device 100 in which one or more disclosed embodiments can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

The processor 102 can include a central processing unit (CPU), a graphics processing unit (GPU), a CPU and GPU located on the same die, or one or more processor cores, wherein each processor core can be a CPU or a GPU. The memory 104 can be located on the same die as the processor 102, or can be located separately from the processor 102. The memory 104 can include a volatile or non-volatile memory, for example, random access memory (RAM), dynamic RAM, or a cache.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Memory 104 and/or storage 106 includes or is a part of a network of memory nodes. For example, memory 104 can include a requesting memory node, a responding memory node, or another memory node as further discussed herein.

Networks of memory nodes, (e.g., Hybrid Memory Cube (HMC) nodes or High Bandwidth Memory (HBM) nodes) can be used to improve aggregate capacity and/or bandwidth of memory systems. Such memory nodes can include die-stacked memories that contain logic circuitry in addition to one or more layers of physical memory, such as dynamic random access memory (DRAM). The logic includes circuitry configured to perform various data movements within the node and/or to accommodate data movement across memory nodes using the memory network interface. It is noted that memory nodes may or may not include memory. For example, a memory node can include logic for controlling memory not located on the memory node. In another example, a memory node includes logic for controlling memory located on the memory node, or located both on and off the memory node.

Discussed herein are various methods, systems, and devices for performing gather-scatter operations across multiple memory nodes in such a way that the only data that may be needed by other nodes may be transferred over the memory network. This can be employed to enable gather and/or scatter operations in a distributed way, and can reduce or minimize network packets as part of the process. The various methods, systems, and devices can reduce or eliminate performance and/or power overhead associated with communicating address and/or control information on a fine-grain, per-data-element basis between memory nodes. Related techniques can also be employed for sparse matrix operations.

As discussed in the examples herein, a memory node includes a memory component (e.g., including a non-transitory computer-readable medium) with associated processing circuitry. It is noted however that memory nodes may or may not include memory. For example, a memory node may include logic for controlling memory not located on the memory node. In another example, a memory node may include logic for controlling memory located on the memory node, or located both on and off the memory node. The memory node may be connected to or operatively coupled with other such units, for example, on the same die, chip, interposer, package, and/or network. Such connections may be direct, or through other memory nodes or other components.

Memory systems can be implemented using multiple memory nodes interconnected through a memory network interface. It is noted that such systems can also be implemented using compute nodes, such as processor in- or processor-near-memory (PIM) nodes, in addition to or instead of memory nodes. For clarity however, example systems are described herein only with respect to memory nodes. Each memory node can include additional logic circuitry which can provide opportunities to integrate additional functionality not typically provided by memory systems. Such logic functions can be used to reduce address and/or command traffic for distributed gather and/or scatter operations over a network of memory nodes.

Memory-centric networks are used to increase aggregate bandwidth and capacity in memory systems. In such networks, compute nodes and memory nodes can be connected via a memory network interface. Communications between nodes, regardless of type, can be performed over the memory network interface. Memory nodes typically include logic circuitry configured to perform data movement and network interface operations. Data processing can be performed in compute nodes, by loading and/or storing data from and/or to the memory nodes. The data processing can also or alternatively be migrated to the memory nodes, for example, in order to perform the processing closer to the stored data. Various methods, systems, and devices discussed herein may be employed to reduce the number and/or size of memory network packets required for distributed gather and/or scatter operations in memory-centric networks.

Each memory node includes a logic layer that implements a memory controller and memory network interface. A source memory node can read data items from, or write data items to, a destination memory node. In a naive implementation, a source memory node may issue a separate read packet to a destination memory node to read each data item, and may issue a separate write packet to the destination memory node to write each memory item.

As discussed further herein however, an application uses the logic layer of the source and/or destination memory node to "gather" data from a memory array of the destination node, for example, for storage into a memory vector, or to "scatter" data into a memory array of a destination node from a memory vector. In this context, memory array refers to a data structure from which data elements of interest are retrieved from non-contiguous memory locations, or into which data elements of interest are stored in non-contiguous memory locations. Similarly, memory vector refers to a data structure from which data elements of interest are retrieved from contiguous memory locations, or into which data elements of interest are stored in contiguous memory locations.

Such gather and scatter operations pack multiple data elements into a single memory network packet, which can have the advantage of reducing memory network overhead. It is noted that the memory array and memory vector both can be located in the destination memory node, or each can be located in a different memory node (e.g., one in the destination node, and one in a third node). It is also noted that in some cases, both the array and vector are located in the source node, in which case a memory network packet may not be required.

Gather and scatter operations use any suitable access pattern supported by the memory nodes. For example, access can be single or multi-dimensional stride, list-based, etc. In general, in gather operations, data elements are gathered, i.e., retrieved from non-contiguous locations of a memory array and are stored in contiguous locations of a memory vector. In scatter operations, data elements from contiguous locations of a memory vector are scattered, i.e., stored to non-contiguous locations in a memory array. Accordingly, as described herein, the array represents source data elements in gather operations; whereas the array represents destination data elements in scatter operations. Similarly, the vector represents destination data elements in gather operations, whereas the vector represents source data elements in scatter operations.

It is noted that no assumptions are made herein regarding virtual memory support. If memory nodes operate in a unified virtual memory address space (e.g., in a Heterogeneous System Architecture) and can perform virtual to physical address translation, their accesses can span across virtual memory pages. If address translation is not supported, memory nodes participating in the gather or scatter operation can ensure that their accesses do not cross pages.

The memory nodes can include DRAM, as discussed above, or any other suitable memory type, such as non-volatile memory, or any combination of such memory types. Such memory can include a non-transitory computer readable medium.

The memory controller and network interface of each memory node can be implemented in the logic circuitry of the memory node. The logic circuitry can be implemented as a logic layer in a 3D-stacked DRAM, as a separate chip on a silicon interposer on which the memory is located, as a bridge chip connected to the memory node through an internal interface, or in any other suitable manner.

For the purposes of the various examples discussed herein, it is assumed that the data is stored in memory locations in memory nodes. However the source and/or destination data can be stored in an internal buffer in a processor that is out of memory address space, an internal buffer within the memory node (e.g., scratchpad), a memory location that is cached in a processor or memory node, or any other suitable storage location.

FIGS. 2-7 illustrate examples of the proposed gather operation across various memory nodes. In the gather operation, data elements are gathered from a source array according to a requested access pattern. The data elements of the source array need not be physically contiguous in the memory address space.

It is noted that the various figures discussed herein are functional diagrams, and may omit various incidental components that may not be germane to illustrating the gather operation. For example, requesting memory node 210 and responding memory node 220 can be directly connected, or can be operationally coupled via other memory nodes, or other types of components that are not shown.

Figure 2:
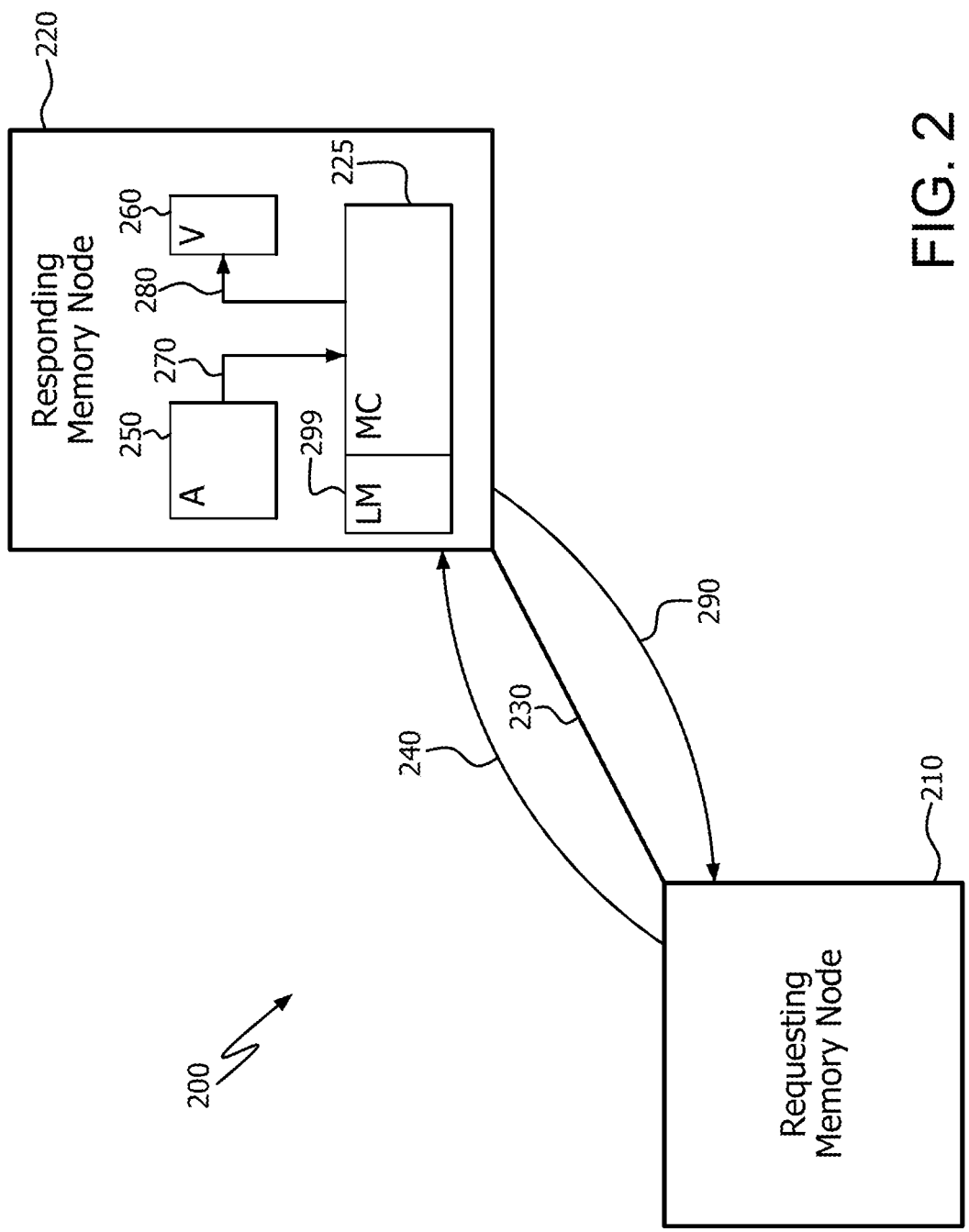
FIG. 2 is a block diagram which illustrates an example multi-node memory network gather operations.

FIG. 2 illustrates an example multi-node memory network 200. Memory network 200 includes a requesting memory node 210, responding memory node 220, and interconnect 230. Interconnect 230 includes any suitable communications medium, such as a bus, and any intermediate devices between requesting memory node 210 and responding memory node 220.

Requesting memory node 210 sends a distributed gather request 240 to responding memory node 220 via interconnect 230. Distributed gather request 240 includes information about the gather operation, such as starting address, access pattern, and/or size. Upon receiving gather request 240, the memory controller 225 of responding memory node 220 gathers (i.e., loads) the data elements from different locations of a source array 250 and temporarily stores them either internally in the logic of memory controller 225, or in a memory, such as a local memory 299.

In the example of FIG. 2, the source array 250 is entirely located in responding memory node 220. Accordingly, responding memory node 220 gathers the data elements in one or more internal load operations 270. The destination vector 260 is also entirely located in responding memory node 220. Accordingly, responding memory node 220 stores the gathered data elements into a single contiguous buffer, i.e., destination vector 260, in one or more internal store operations 280. It is noted that the gathered data elements can be stored into destination vector 260 directly or indirectly (e.g., after first having been stored in an intermediate buffer).

After all of the requested data elements are packed into destination vector 260, the memory controller 225 of responding memory node 220 sends a memory network gather response 290 back to requesting memory node 210. Thus, the distributed gather operation loads data elements from discontiguous memory locations (in this case, within array 250) into a contiguous memory location (in this case, vector 260).

Figure 3:
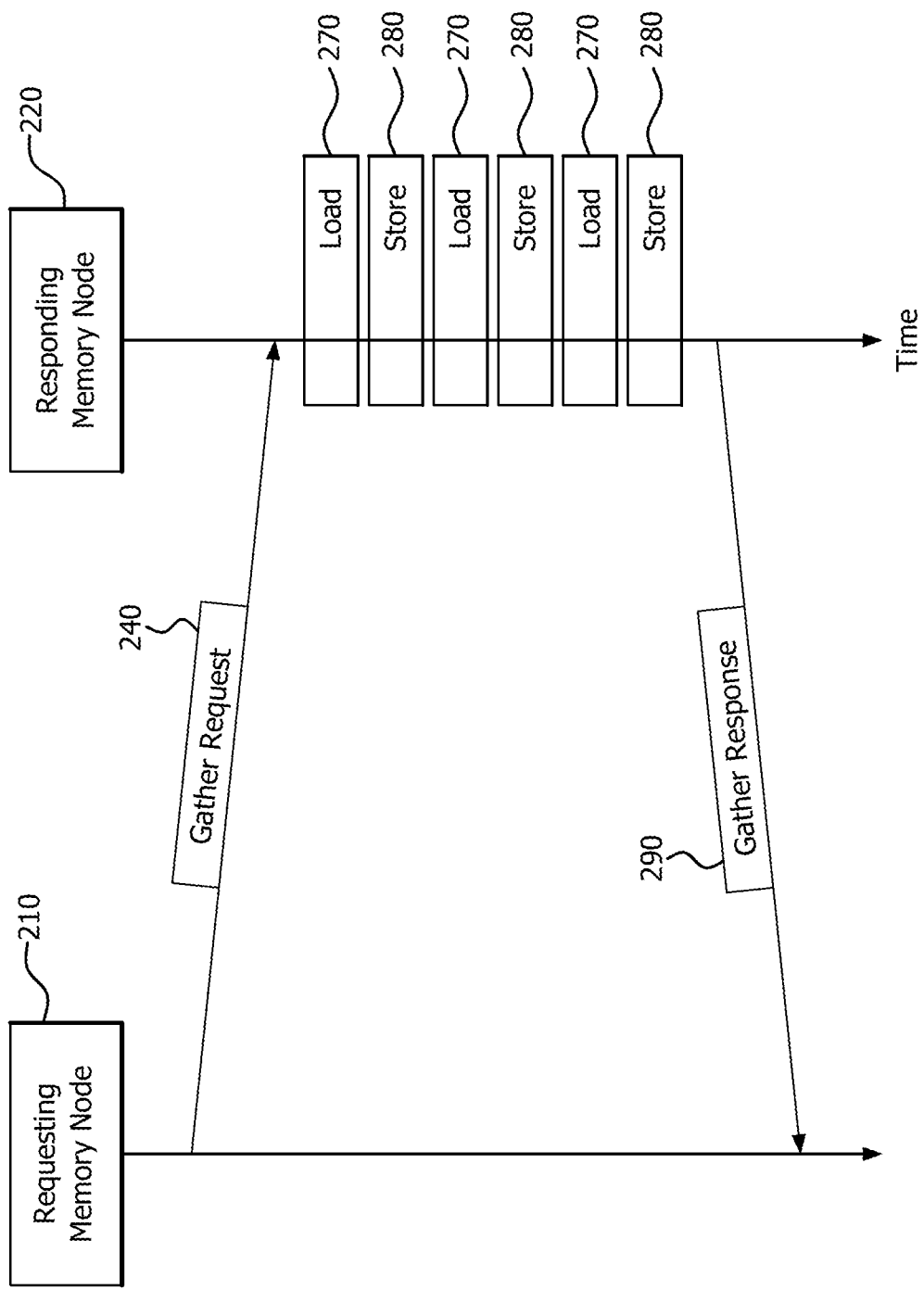
FIG. 3 is a signal diagram illustrating the signaling between memory nodes shown and described with respect to FIG. 2.

FIG. 3 is a signal diagram illustrating the signaling between requesting memory node 210 and responding memory node 220, as well as the internal load operations 270 and internal store operations 280, as the gathered data elements are moved to a single contiguous buffer.

Figure 4:
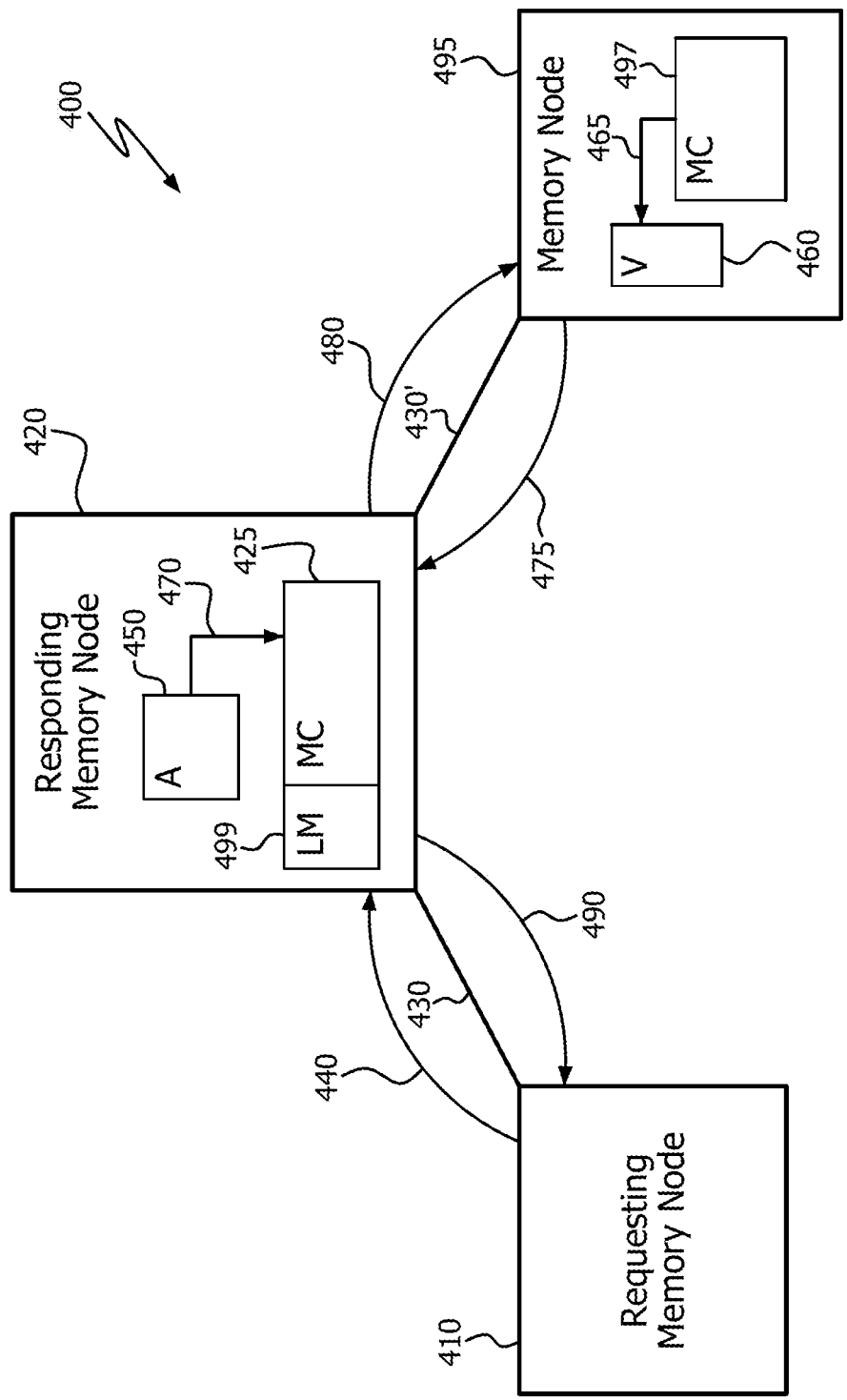
FIG. 4 is a block diagram which illustrates another example multi-node memory network gather operations.

FIG. 4 illustrates an example multi-node memory network 400. Memory network 400 includes a requesting memory node 410, responding memory node 420, and interconnects 430 and 430'. Interconnect 430 includes any suitable communications medium, such as a bus, and any intermediate devices between requesting memory node 410 and responding memory node 420. Interconnect 430' may be the same interconnect (e.g., the same bus) as interconnect 430, or a different suitable interconnect. Memory network 400 also includes another memory node 495 which is in communication with responding memory node 420 via interconnect 430'.

Requesting memory node 410 sends a distributed gather request 440 to responding memory node 420 via interconnect 430. Distributed gather request 440 includes information about the gather operation, such as starting address, access pattern, and/or size. Upon receiving gather request 440, the memory controller 425 of responding memory node 420 gathers (i.e., loads) the data elements from different locations of a source array 450 and temporarily stores them either internally in the logic of memory controller 425, or in a memory, such as local memory 499.

In the example of FIG. 4, the source array 450 is entirely located in responding memory node 420. Accordingly, responding memory node 420 gathers the data elements in an internal load operation or operations 470. It is noted that a plurality of load operations 470 can be triggered by a single gather request 440.

The destination vector 460 is located in memory node 495. Accordingly, responding memory node 420 packs the data elements into a write request or multiple write requests 480, and transmits write request(s) 480 to memory node 495. In response, the memory controller 497 of memory node 495 stores the data elements into destination vector 460 in a store operation or multiple store operations 465. It is noted that multiple write requests 480 and multiple store operations 465 can be triggered by a single distributed gather request 440.

For each write request received by memory node 495, the memory controller 497 sends a write response message 475 to responding memory node 420, each write response message 475 indicating that requested data elements within the write request have been stored into destination vector 460. After receiving all write response messages 475, responding memory node 420 sends a memory network gather response 490 back to requesting memory node 410. Thus, the distributed gather operation loads data elements from discontiguous memory locations (in this case, within array 450) into a contiguous memory location (in this case, vector 460). It is noted that although array 450 is shown in this example as located entirely within responding memory node 420 for clarity, in some implementations array 450 is distributed over multiple memory nodes. In such cases, requesting memory node 410 can send multiple gather requests, one for each responding memory node which includes a portion of array 450.

Figure 5:
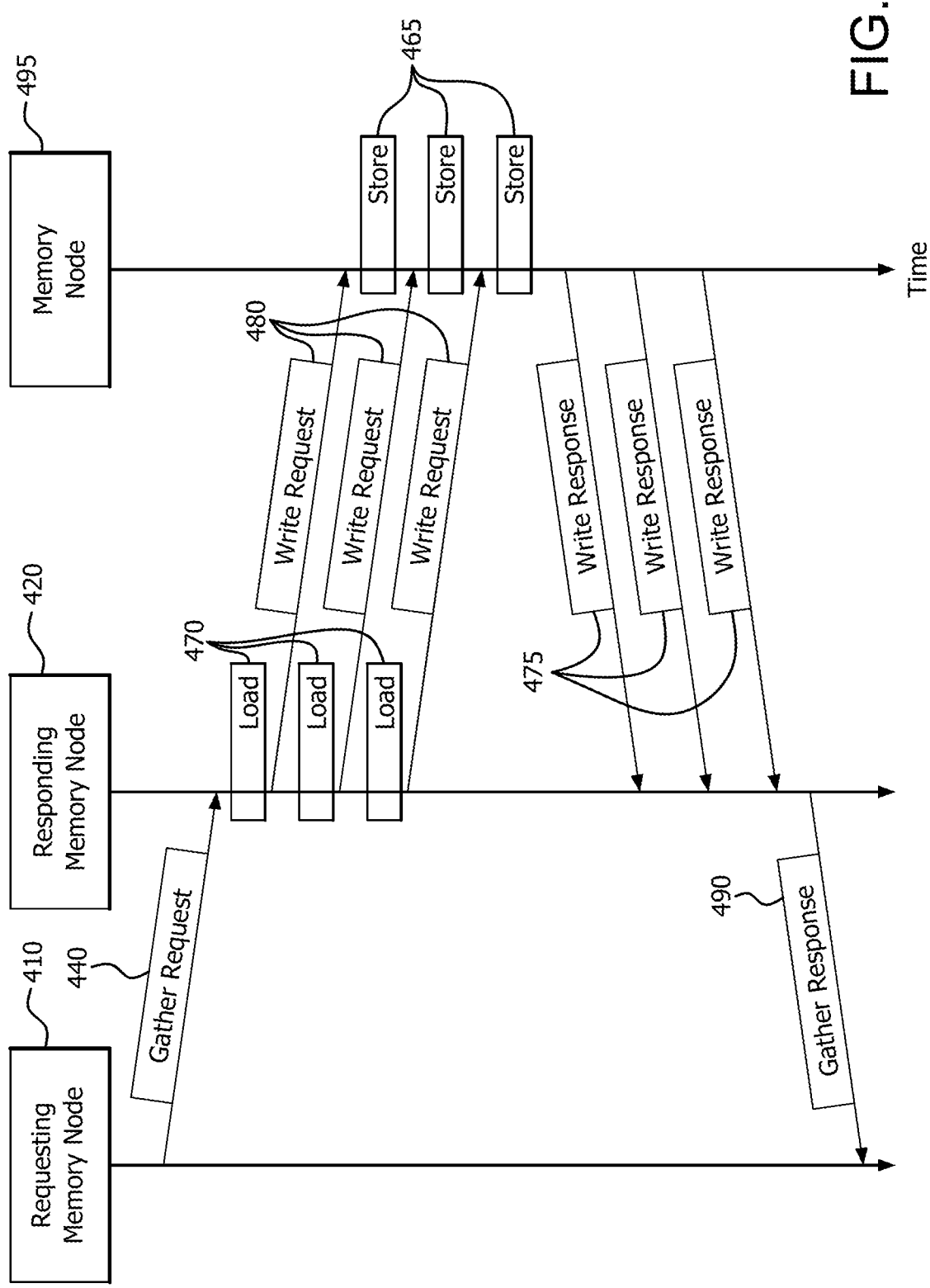
FIG. 5 is a signal diagram illustrating the signaling among memory nodes shown and described with respect to FIG. 4.

FIG. 5 is a signal diagram illustrating the signaling among requesting memory node 410, responding memory node 420, and memory node 495, as well as the load operations 470 and store operations 465. FIG. 5 shows a load operation 470 corresponding to each write request 480 for exemplary purposes; however, it is noted that the number of write requests does not necessarily equal the number of loads. For example, in another situation, responding memory node 420 may require 15 internal loads to gather data, but may need to send only 3 write requests. This is because the data elements are packed into each write request (e.g., 5 data elements in each write request with these figures).

Figure 6:
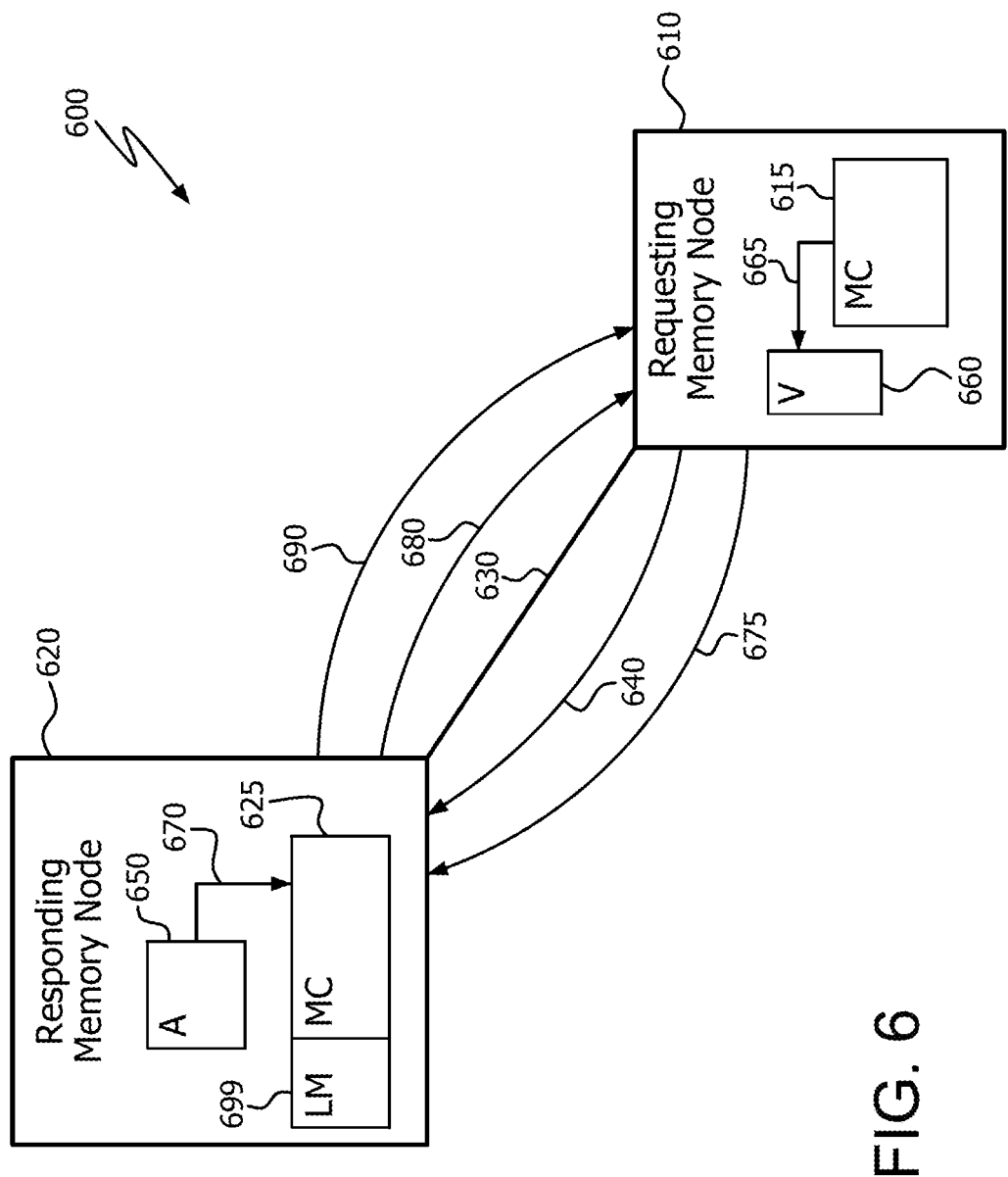
FIG. 6 is a block diagram which illustrates a further example multi-node memory network gather operations.

FIG. 6 illustrates an example multi-node memory network 600. Memory network 600 includes a requesting memory node 610, responding memory node 620, and interconnect 630. Interconnect 630 includes any suitable communications medium, such as a bus, and any intermediate devices between requesting memory node 610 and responding memory node 620.

Requesting memory node 610 sends a distributed gather request 640 to responding memory node 620 via interconnect 630. Distributed gather request 640 includes information about the gather operation, such as starting address, access pattern, and/or size. Upon receiving gather request 640, the memory controller 625 of responding memory node 620 gathers (i.e., loads) the data elements from different locations of a source array 650 and temporarily stores them either internally in the logic of memory controller 625, or in a memory, such as local memory 699.

In the example of FIG. 6, the source array 650 is entirely located in responding memory node 620. Accordingly, responding memory node 620 gathers the data elements in an internal load operation or operations 670.

The destination vector 660 is located in requesting memory node 210. Accordingly, responding memory node 620 packs each of the data elements into one or multiple write requests 680, and transmits write request(s) 680 to requesting memory node 610. Memory controller 615 of requesting memory node 610 then stores the data elements into destination vector 660 using one or multiple write storage operations 665. Thus, multiple write requests 680 and multiple store operations 665 may be triggered by a single distributed gather request 640.

After all of the requested data elements are packed into destination vector 660, the memory controller of requesting memory node 610 sends write response message(s) 675 to responding memory node 620, indicating that the requested data elements have been packed into destination vector 660. After receiving write response message(s) 675, responding memory node 620 sends a memory network gather response 690 back to requesting memory node 610. Thus, the distributed gather operation loads data elements from discontiguous memory locations (in this case, within array 650) into a contiguous memory location (in this case, vector 660).

Figure 7:
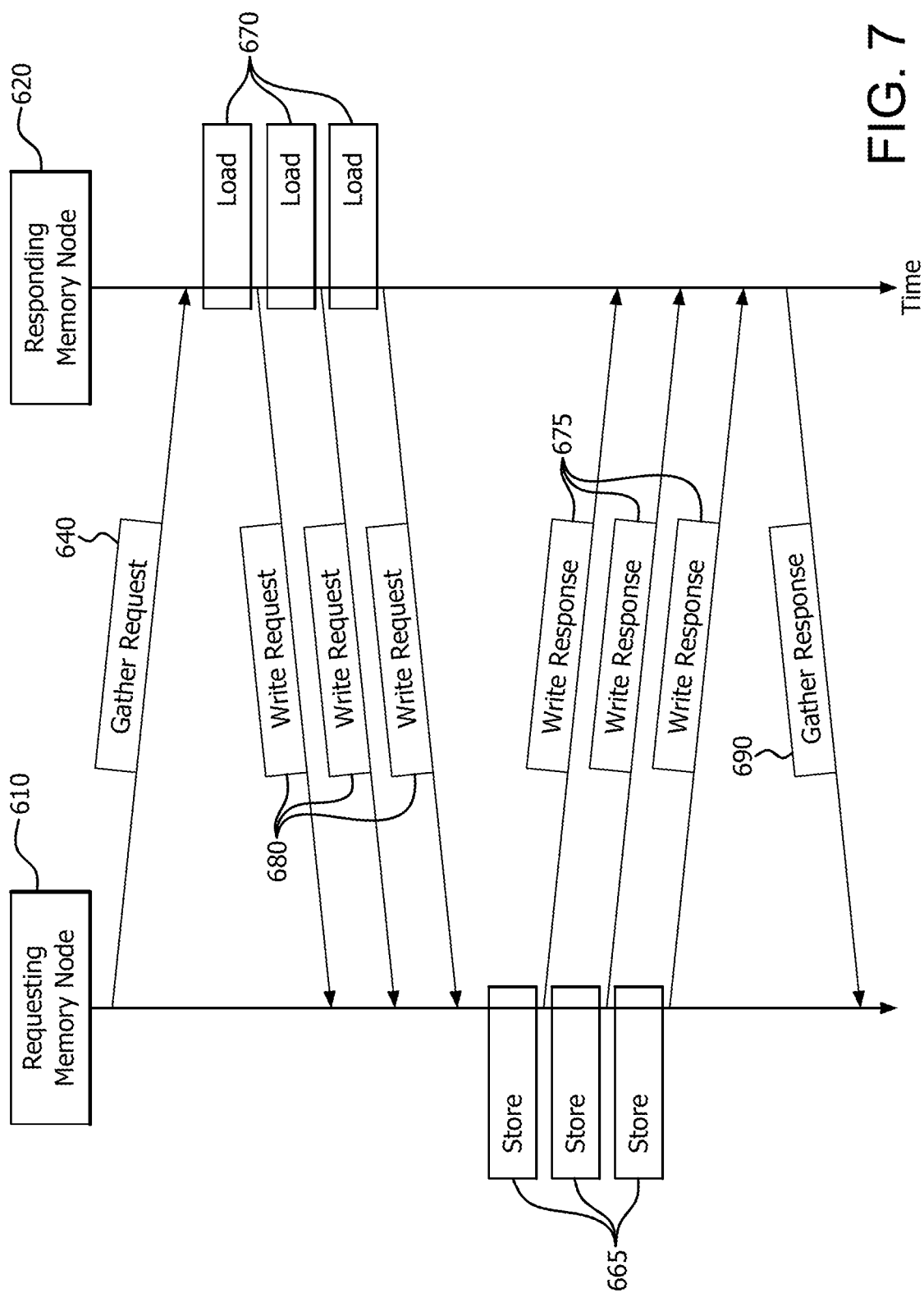
FIG. 7 is a signal diagram illustrating the signaling between memory nodes shown and described with respect to FIG. 6.

FIG. 7 is a signal diagram illustrating the signaling between requesting memory node 610 and responding memory node 620, as well as the load operations 670 and store operations 680. FIG. 7 shows a load operation 670 corresponding to each write request 680 for exemplary purposes; however, it is noted that the number of write requests does not necessarily equal the number of loads. For example, in another situation responding memory node 620 may require 15 loads to gather data, but may need to send only 3 write requests. This is because the data elements are packed into each write request (e.g., 5 data elements in each write request with these figures).

As can be seen from the examples of FIGS. 2-7, gather operations entail loading data elements from a source array according to a requested access pattern. The data elements of the source array need not be physically contiguous in the memory address space. The source array can be entirely located in a single memory node, as in FIGS. 2-7. In such cases, the requesting memory node can send a single memory network gather request to the responding memory node that holds the source array.

It is noted that in other cases, the source array can be distributed across multiple memory nodes. The source array can be distributed at a page granularity, super-page granularity, multiple of page granularity, or any other defined granularity. In such cases, the requesting memory node can send multiple memory network gather requests to memory nodes that each hold part of the source array. The gather requests can be sent in parallel, or serially to responding memory nodes.

The gather request can include information about the gather operations, such as starting address, access pattern, and/or size. Upon receiving the gather request, the memory controller of the responding memory node gathers (i.e., loads) data elements from different locations of the source array and can temporarily store them either internally in the memory controller logic or in the local memory. The memory controller then packs the multiple gathered data elements into a single contiguous buffer.

If the destination vector resides in the same memory node as the source array, the memory controller can store data from the contiguous buffer to the destination vector via internal memory store commands. An example of this scenario is illustrated in FIGS. 2 and 3.

If the destination vector does not reside in the same memory node as the source array, the memory controller can send data from the contiguous buffer to the node containing the destination vector via a memory network write request(s). An example of this scenario is illustrated in FIGS. 4 and 5. In some cases, the destination vector may not reside in the same memory node as the source array, but the destination vector may reside in the requesting memory node. An example of this scenario is illustrated in FIGS. 6 and 7.

It is noted that to improve interconnect utilization and/or to reduce or minimize network packet count, large write transactions (e.g., larger than a single cache line at a time) can be used.

The gathering of data from the source array and writing of the data to the destination vector can be repeated until all data elements are gathered in the destination vector, after which the responding memory node sends a memory network gather response to the requesting memory node. Thus, the distributed gather operation loads data elements from discontinuous memory locations into a contiguous memory location.

FIGS. 8-13 illustrate examples of the proposed scatter operation across various memory nodes. In the scatter operation, memory nodes scatter data elements into a destination array according to a requested access pattern. The destination data elements need not be physically contiguous in the memory address space and can be stored into different locations of the destination array.

Figure 8:
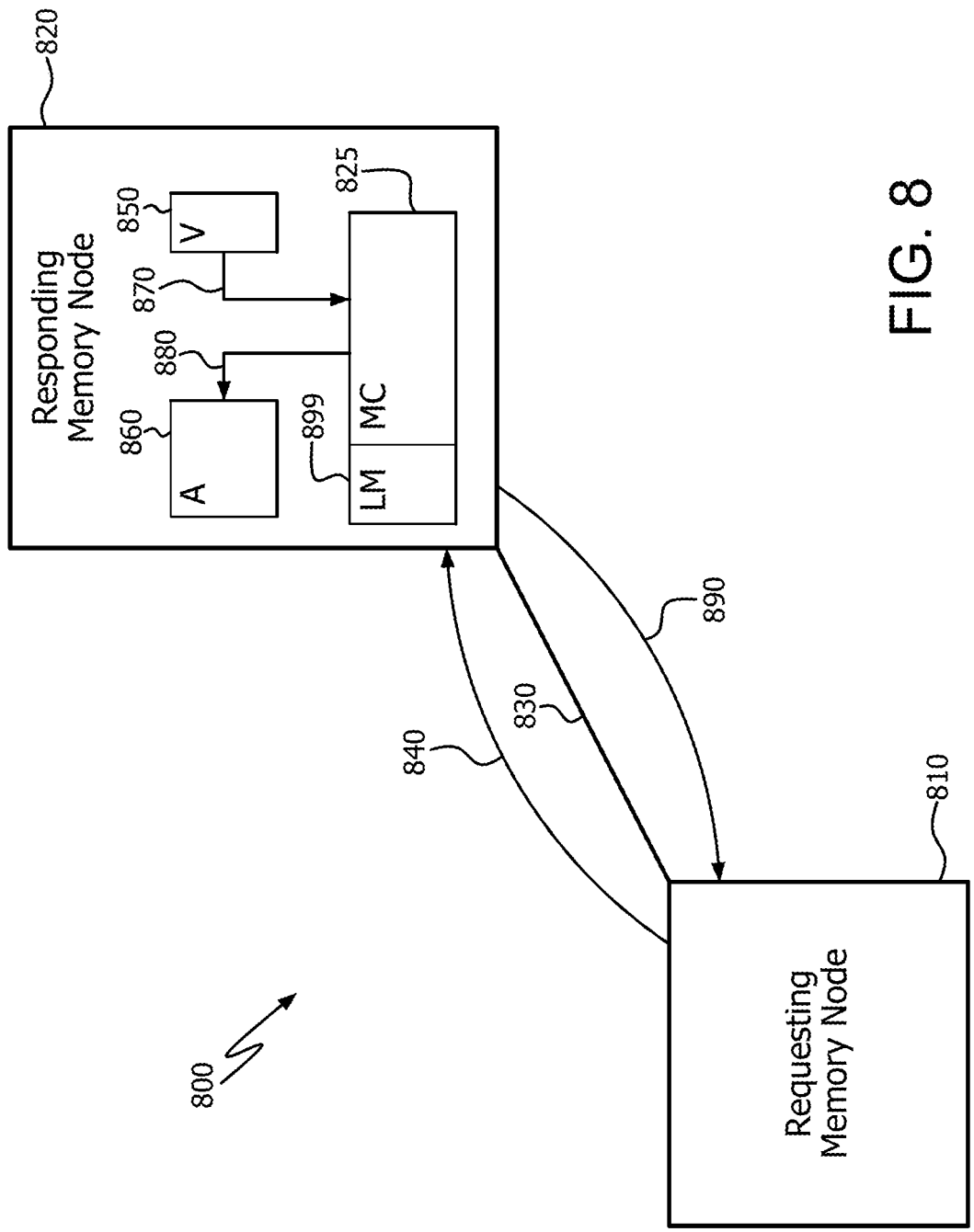
FIG. 8 is a block diagram which illustrates an example multi-node memory network scatter operations.

FIG. 8 illustrates an example multi-node memory network 800. Memory network 800 includes a requesting memory node 810, responding memory node 820, and interconnect 830. Interconnect 830 includes any suitable communications medium, such as a bus, and any intermediate devices between requesting memory node 810 and responding memory node 820.

Requesting memory node 810 sends a distributed scatter request 840 to responding memory node 820 via interconnect 830. Distributed scatter request 840 includes information about the scatter operation, such as starting address, access pattern, and/or size. Upon receiving scatter request 840, the memory controller 825 of responding memory node 820 loads the data elements from a source vector 850 and temporarily stores them either internally in the logic of memory controller 825, or in a memory such as local memory 899. The memory controller of responding memory node 820 then scatters (i.e., stores according to the access pattern) the data elements into the destination array 860.

In the example of FIG. 8, the source vector 850 is entirely located in responding memory node 820. Accordingly, responding memory node 820 loads the data elements in an internal load operation or operations 870. The destination array 860 is also entirely located in responding memory node 820. Accordingly, responding memory node 820 scatters (i.e., stores according to the access pattern) the data elements in an internal store operation or operations 880. It is noted that multiple load operations 870 and multiple store operations 880 can be triggered by a single distributed scatter request 840.

After all of the requested data elements are scattered into destination array 860, the memory controller of responding memory node 820 sends a memory network scatter response 890 back to requesting memory node 810. Thus, the distributed scatter operation loads data elements from contiguous memory locations (in this case, within vector 850) into noncontiguous memory locations (in this case, within array 860). It is noted that while source vector 850 and destination array 860 are shown in FIG. 8 using separate boxes, source vector 850 and destination array 860 can be stored in the same memory device. It is noted that such memory devices for all embodiments discussed herein can include any suitable non-transitory storage medium, such as a random access memory (RAM).

Figure 9:
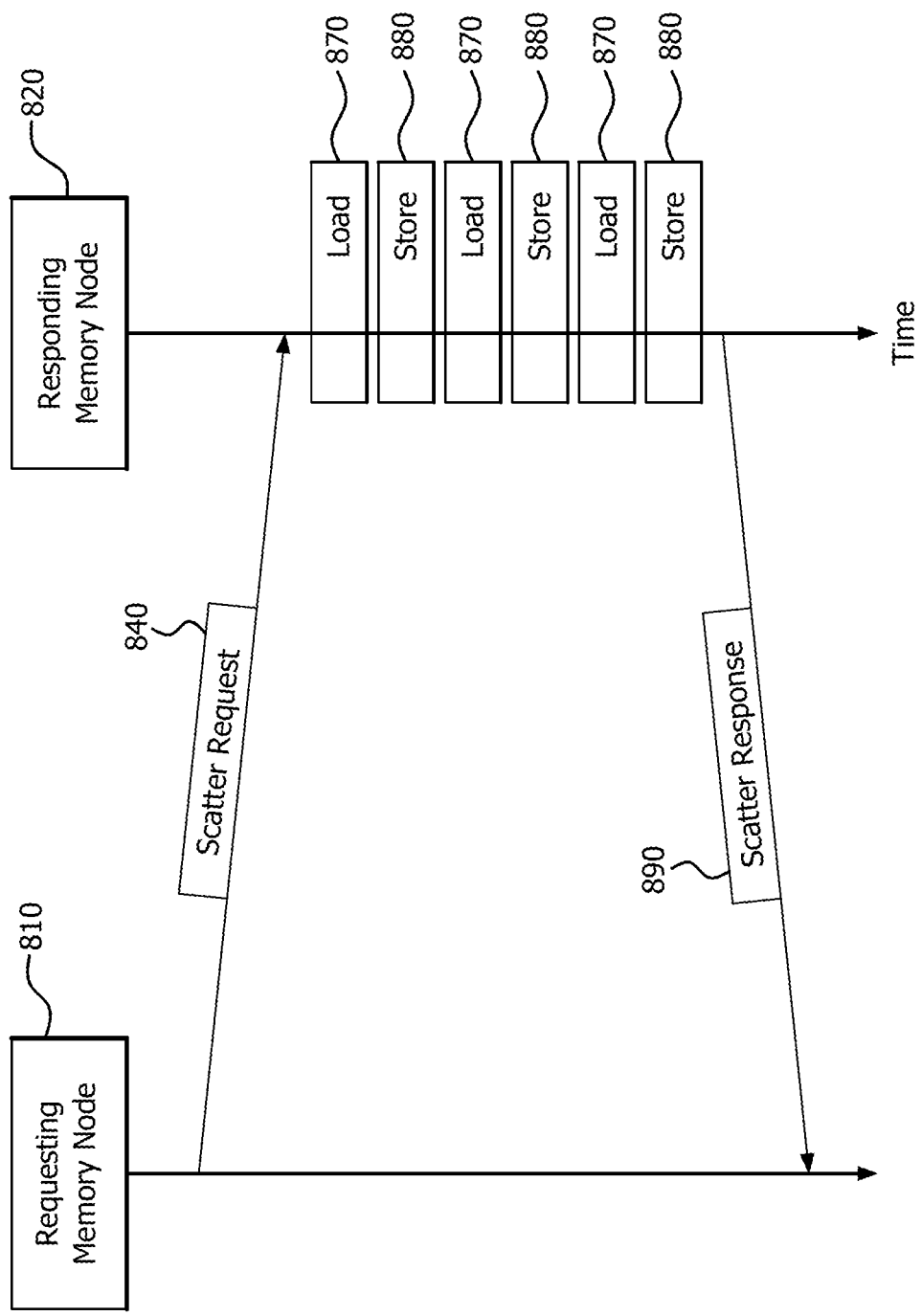
FIG. 9 is a signal diagram illustrating the signaling between memory nodes shown and described with respect to FIG. 8.

FIG. 9 is a signal diagram illustrating the signaling between requesting memory node 810 and responding memory node 820, as well as the internal load operations 870 and internal store operations 880.

Figure 10:
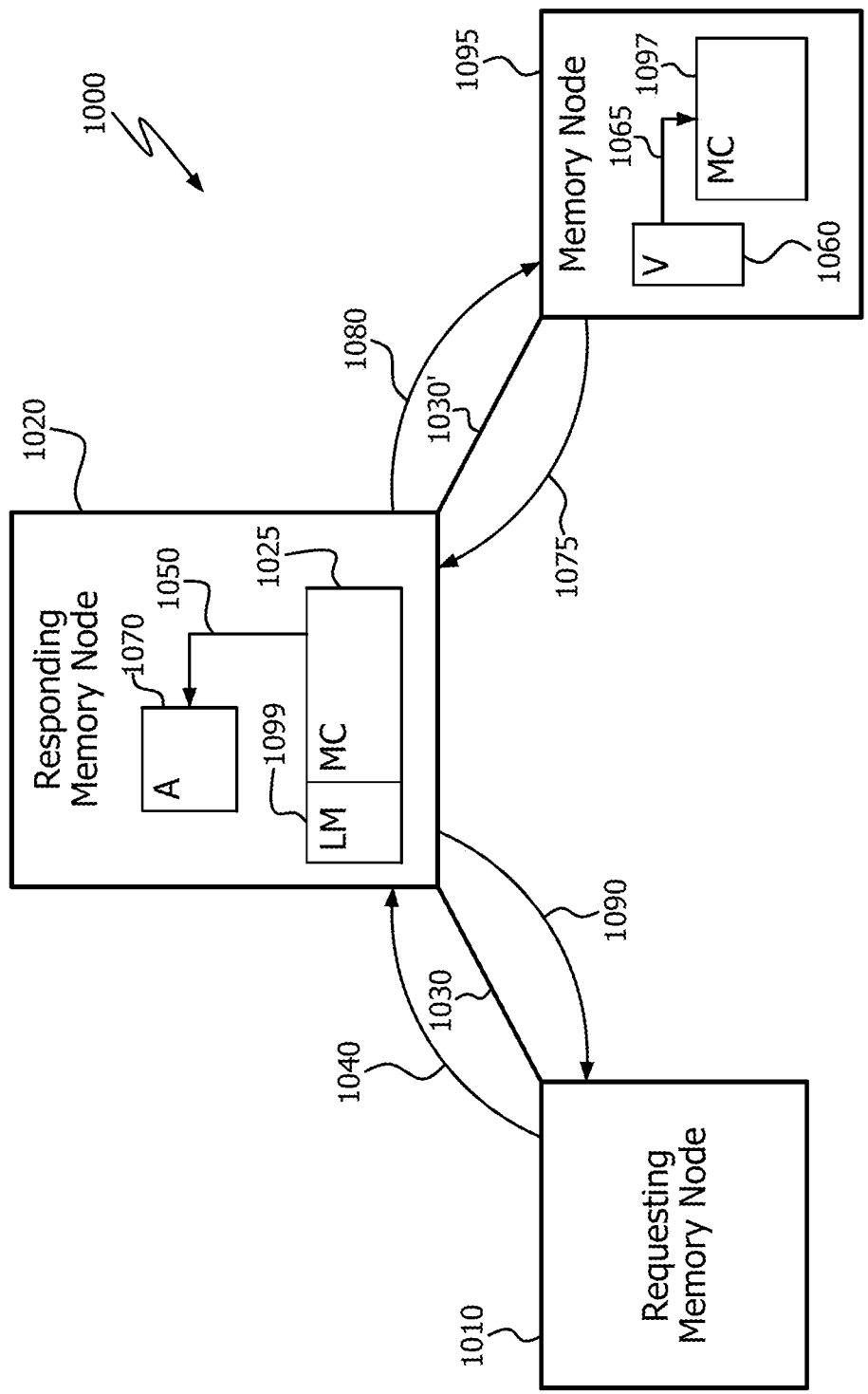
FIG. 10 is a block diagram which illustrates another example multi-node memory network scatter operations.

FIG. 10 illustrates an example multi-node memory network 1000. Memory network 1000 includes a requesting memory node 1010, responding memory node 1020, and interconnects 1030 and 1030'. Interconnect 1030 includes any suitable communications medium, such as a bus, and any intermediate devices between requesting memory node 1010 and responding memory node 1020. Interconnect 430' may be the same interconnect (e.g., the same bus) as interconnect 430, or a different suitable interconnect.

Memory network 1000 also includes another memory node 1095 which is in communication with responding memory node 1020 via interconnect 1030.

Requesting memory node 1010 sends a distributed scatter request 1040 to responding memory node 1020 via interconnect 1030. Distributed scatter request 1040 includes information about the scatter operation, such as starting address, access pattern, and/or size.

The source vector 1060 is located in memory node 1095. Accordingly, after receiving scatter request 1040, the memory controller 1025 of responding memory node 1020 transmits read request(s) 1080 to memory node 1095. In response, memory controller 1097 of memory node 1095 loads the data elements from source vector 1060 using load operation(s). It is noted that multiple read requests 1080 and multiple load operations 1065 can be triggered by a single distributed scatter request 1040.

The destination array 1070 is located in responding memory node 1020. Accordingly, memory node 1095 packs the data elements into one or multiple read responses 1075, and transmits read response(s) 1075 to responding memory node 1020. The data elements can be temporarily stored either in the logic of memory controller 1025, or in a memory such as local memory 1099. Memory controller 1025 of responding memory node 1020 then scatters (i.e., stores the data elements according to the access pattern) the data elements into destination array 1070 in a storage operation 1050. Read response(s) 1075 can include packed data elements, while internal store operations 1050 performed by memory controller 1025 of responding memory node 1020 can be performed for each scattered data element.

After all of the requested data elements have been scattered to the destination array 1070, the memory controller of responding memory node 1020 sends a distributed scatter response message 1090 to requesting memory node 1010.

Figure 11:
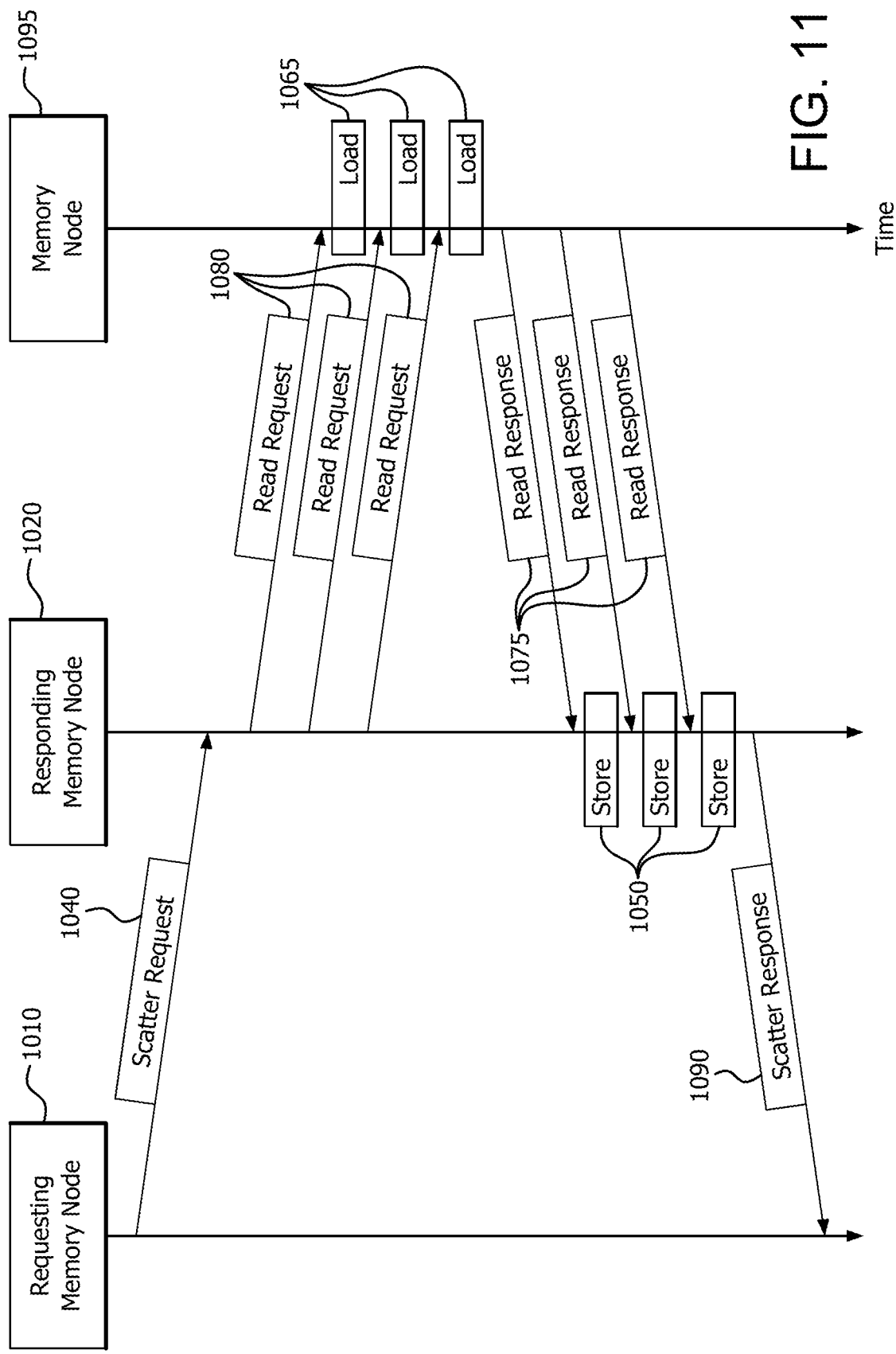
FIG. 11 is a signal diagram illustrating the signaling among memory nodes shown and described with respect to FIG. 10.

FIG. 11 is a signal diagram illustrating the signaling among requesting memory node 1010, responding memory node 1020, and memory node 1095, as well as the load operations 1065 and store operations 1050. FIG. 11 shows a store operation 1050 corresponding to each read response 1075 for exemplary purposes; however, it is noted that the number of read responses does not necessarily equal the number of stores. For example, in another situation responding memory node 1020 may require 15 internal stores to scatter data, but may have received only 3 read responses. This is because the data elements are packed into each read response (e.g., 5 data elements in each read response with these figures).

Figure 12:
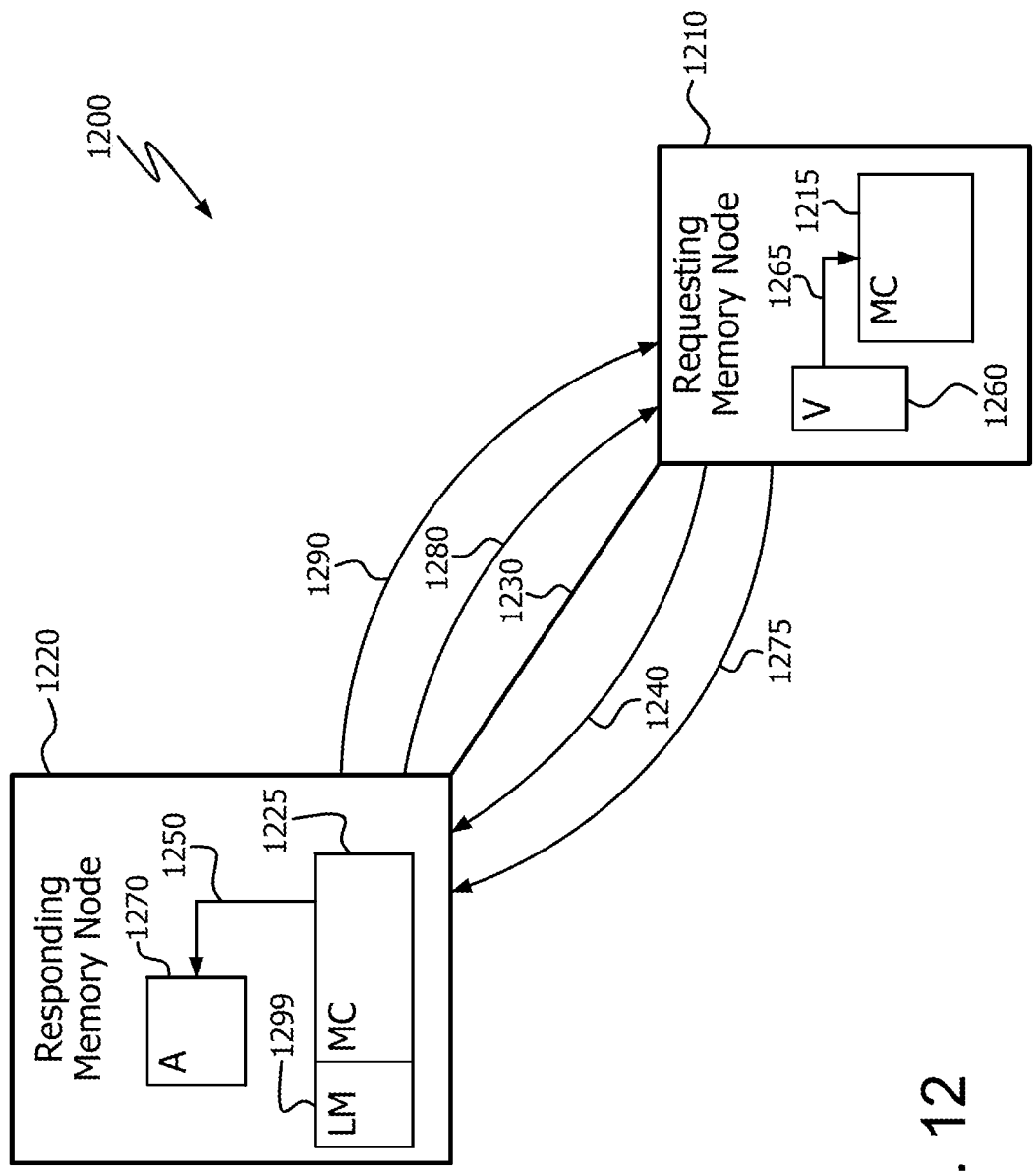
FIG. 12 is a block diagram which illustrates an further example multi-node memory network scatter operations.

FIG. 12 illustrates an example multi-node memory network 1200. Memory network 1200 includes a requesting memory node 1210, responding memory node 1220, and interconnect 1230. Interconnect 1230 includes any suitable communications medium, such as a bus, and any intermediate devices between requesting memory node 1210 and responding memory node 1220.

Requesting memory node 1210 sends a distributed scatter request 1240 to responding memory node 1220 via interconnect 1230. Distributed scatter request 1240 includes information about the scatter operation, such as starting address, access pattern, and/or size.

In the example of FIG. 12, the source vector 1260 is entirely located in requesting memory node 1210. Accordingly, after receiving scatter request 1240, responding memory node 1220 transmits one or more read request(s) 1280 to requesting memory node 1210. In response, memory controller 1215 of requesting memory node 1210 loads the data elements from source vector 1260 using one or more load operations 1265.

The destination array 1270 is located in responding memory node 1220. Accordingly, requesting memory node 1210 packs the data elements into one or more read response message(s) 1275, and transmits one or more read response message(s) 1275 to responding node 1220. The data elements can be temporarily stored either in the logic of memory controller 1225, or in a memory such as local memory 1299.

The destination array 1270 is located in responding memory node 1220. Accordingly, after receiving read response message 1275, the memory controller 1225 of responding memory node 1220 scatters (i.e., stores according to the access pattern) the data elements into destination array 1270 in a storage operation 1250.

After all of the requested data elements are scattered into destination array 1270, the memory controller 1225 of responding memory node 1220 sends a distributed scatter response message 1290 back to requesting memory node 1210. Thus, the distributed scatter operation loads data elements from contiguous memory locations (in this case, vector 1260) into discontiguous memory locations (in this case, within array 1270).

Figure 13:
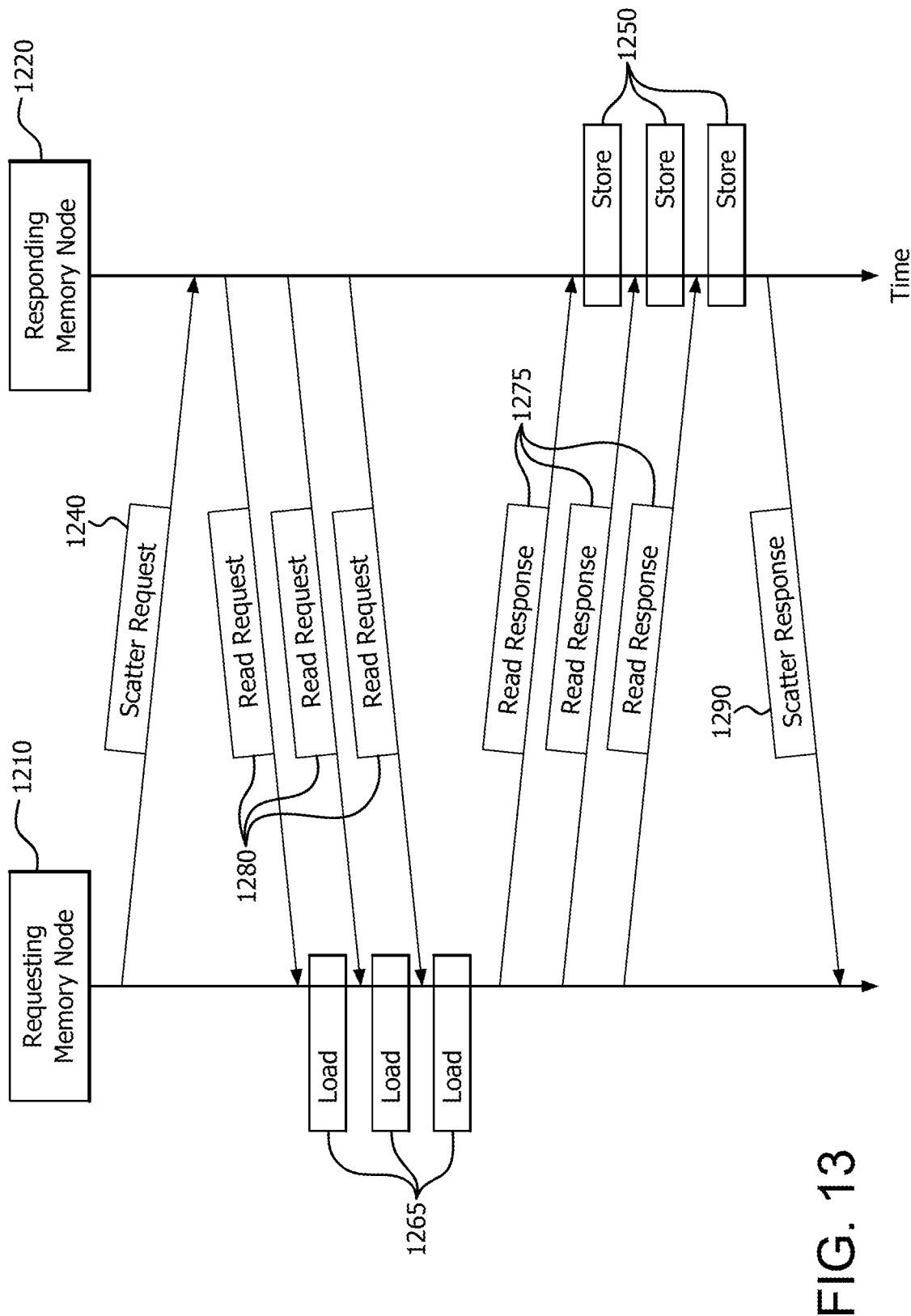
FIG. 13 is a signal diagram illustrating the signaling between memory nodes shown and described with respect to FIG. 12.

FIG. 13 is a signal diagram illustrating the signaling between requesting memory node 1210 and responding memory node 1220, as well as the load operations 1265 and store operations 1250.

As can be seen from the examples of FIGS. 8-13, scatter operations entail storing data elements to a destination array according to a requested access pattern. The data elements of the destination array need not be physically contiguous in the memory address space. The destination array can be entirely located in a single memory node, as in FIGS. 8-13. In such cases, the requesting memory node can send a single memory network scatter request to the responding memory node that holds the destination array.

It is noted that in other cases, the destination array can be distributed across multiple memory nodes. The destination array can be distributed at a page granularity, super-page granularity, multiple of page granularity, or any other defined granularity. In such cases, the requesting memory node can send multiple memory network scatter requests to memory nodes that each hold part of the destination array. The scatter requests can be sent in parallel, or serially to responding memory nodes.

The scatter request can include information about the scatter operations, such as starting address, access pattern, and/or size. If the source vector resides in the same memory node as the destination array, the memory controller of the responding memory may read data from the source vector via internal memory load commands. An example of this scenario is illustrated in FIGS. 8 and 9.

If the source vector does not reside in the same memory node as the destination array, the memory controller of the responding memory node can read data elements from the node containing the source vector (which may be packed in a single contiguous location) via a memory network read request. An example of this scenario is illustrated in FIGS. 10 and 11. In some cases, the source vector does not reside in the same memory node as the destination array, but the source vector resides in the requesting memory node. An example of this scenario is illustrated in FIGS. 12 and 13.

Figure 14:
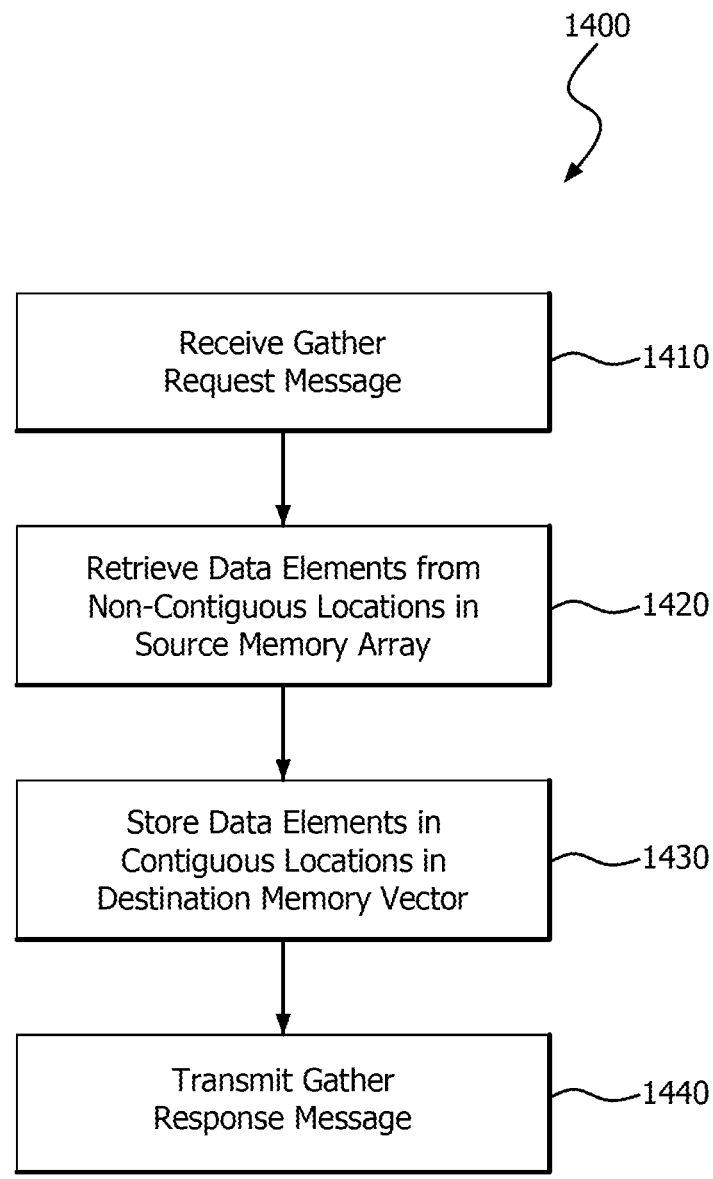
FIG. 14 is a flow chart illustrating an example method for performing a gather operation.

FIG. 14 is a flow chart illustrating an example method 1400 for performing a gather operation. Method 1400 can be extended or modified according to any of the various techniques discussed herein.

In step 1410, receiver circuitry of a responding memory node receives a gather request message from a requesting memory node. In step 1420, retrieval circuitry of the responding memory node retrieves data elements from non-contiguous locations in a source memory array. It is noted that as further described herein, part or all of the source memory array can be located on the responding memory node, on another node, or both, including for example the requesting memory node. In step 1430, storing circuitry of the responding memory node stores the data elements into contiguous locations in a destination memory vector. In step 1440, transmitting circuitry of the responding memory node transmits a gather response message to the requesting memory node.

Figure 15:
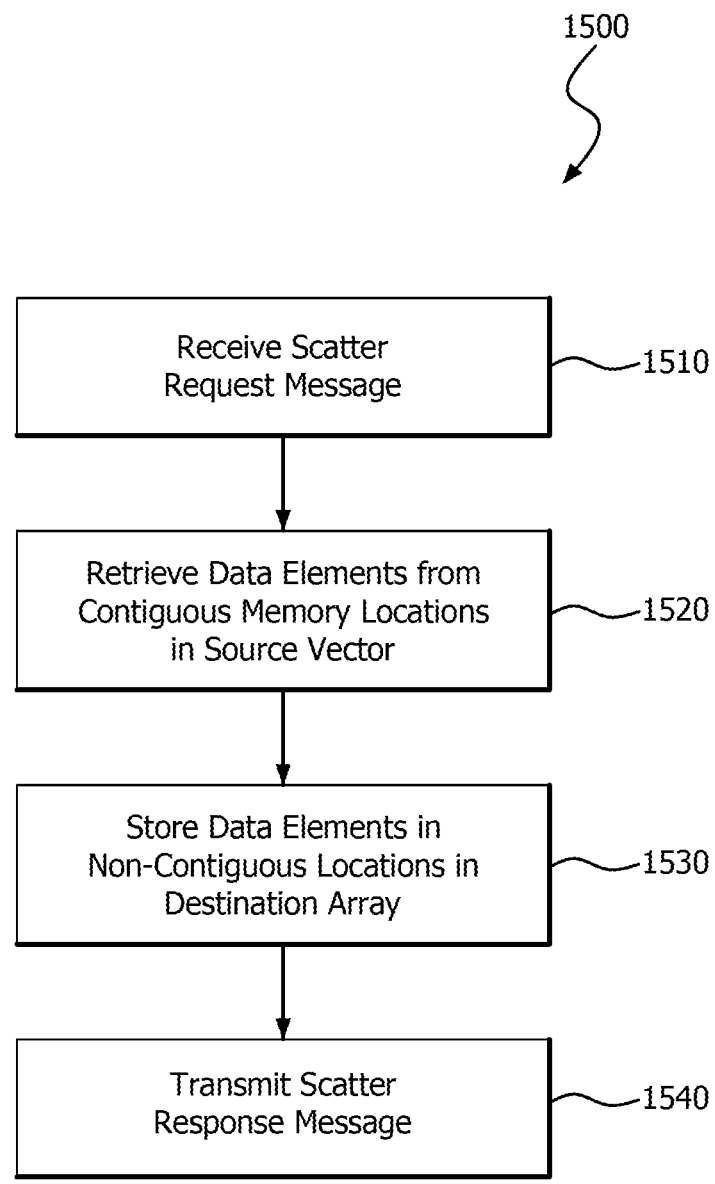
FIG. 15 is a flow chart illustrating an example method for performing a scatter operation.

FIG. 15 is a flow chart illustrating an example method 1500 for performing a scatter operation. Method 1500 can be extended or modified according to any of the various techniques discussed herein.

In step 1510, receiver circuitry of a responding memory node receives a scatter request message from a requesting memory node. In step 1520, retrieval circuitry of the responding memory node retrieves data elements from contiguous locations in a source memory vector. In step 1530, storing circuitry of the responding memory node stores the data elements into non-contiguous locations in a destination memory array. It is noted that as further described herein, part or all of the destination memory array is located on the responding memory node, on another node, or both, including for example the requesting memory node. In step 1540, transmitting circuitry of the responding memory node transmits a scatter response message to the requesting memory node.

On example use case for gather and/or scatter operations is in applications that perform computations on sparse matrices. Sparse matrices are typically represented using a standard format, such as compressed row storage (CRS) to provide savings in memory capacity. However, memory accesses of sparse matrices can be inefficient, as they may require loading from, and/or storing to, non-contiguous regions of memory. Sparse matrices can be stored in a memory node non-local to the processing node, or can be physically distributed among multiple memory nodes, further complicating access to data elements of the matric. The data accesses can be facilitated through distributed gather/scatter operations. For example, the requesting memory node can embed a list of data elements in memory network gather/scatter requests (i.e., list-based gather/scatter). The responding memory node or nodes can extract the access pattern from the gather/scatter request, perform internal loads and/or stores, bundle data elements, and transfer bundled data elements over the memory network as discussed in various examples above. This form of data access can have the advantage of providing a reduction in overhead, such as a reduction in memory packets transferred over the network, reducing the memory bandwidth required for sparse matrix computations.

It is noted that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be mask works that are then used in a semiconductor manufacturing process to manufacture a processor which implements aspects of the embodiments.

The methods provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for storing data into non-contiguous memory locations using a responding memory node which includes a first memory controller and a first memory network interface, and using a requesting memory node which includes a second memory controller and a second memory network interface, the method comprising:

receiving, by the first memory controller of the responding memory node, via the first memory network interface over a memory network from the second memory network interface, a gather request message from the second memory controller of the requesting memory node, the gather request message instructing the responding memory node to retrieve data elements from non-contiguous locations in a source memory array and store the data elements in contiguous locations in a destination memory vector;

retrieving, by retrieval circuitry of the responding memory node, the data elements from the non-contiguous locations in the source memory array;

storing, by storing circuitry of the responding memory node, the data elements in contiguous locations in the destination memory vector; and transmitting, by the first memory controller of the responding memory node to the second memory controller of the requesting memory node, a gather response message indicating that the data elements have been stored into the destination vector.

2. The method of claim 1, wherein the source memory array is located entirely on the responding memory node.

3. The method of claim 1, wherein the source memory array is located partially on the responding memory node and partially on at least one other memory node.

4. The method of claim 1, wherein the destination memory vector is located on the responding memory node, the method further comprising storing the data elements into the destination memory vector via an internal memory store operation.

5. The method of claim 1, wherein the destination memory vector is located on the requesting memory node, the method further comprising storing the data elements into the destination memory vector by transmitting a write request message to the requesting memory node.

6. The method of claim 5, wherein the responding memory node transmits the gather response message to the requesting memory node on a condition that the responding memory node receives a write response message from the requesting memory node.

7. The method of claim 1, wherein the destination vector is located on a third memory node, the method further comprising storing the data elements into the destination memory vector by transmitting a write request message to the third memory node.

8. The method of claim 7, wherein the responding memory node transmits the gather response message to the requesting memory node on a condition that the responding memory node receives a write response message from the third memory node.

9. A method for retrieving data from non-contiguous memory locations using a responding memory node which includes a first memory controller and a first memory network interface, and using a requesting memory node which includes a second memory controller and a second memory network interface, the method comprising:
   receiving, by the first memory controller of the responding memory node, via the first memory network interface over a memory network from the second memory network interface, a scatter request message from the second memory controller of the requesting memory node, the scatter request message instructing the responding memory node to retrieve data elements from contiguous locations in a source memory vector and store the data elements in non-contiguous locations in a destination memory array;
   retrieving, by retrieval circuitry of the responding memory node, the data elements from the contiguous locations in the source memory vector;
   storing, by storing circuitry of the responding memory node, the data elements in non-contiguous locations in the destination memory array; and
   transmitting, by the first memory controller of the responding memory node to the second memory controller of the requesting memory node, a scatter response message indicating that the data elements have been stored into the destination memory array.

10. The method of claim 9, wherein the destination memory array is located entirely on the responding memory node.

11. The method of claim 9, wherein the destination memory array is located partially on the responding memory node and partially on at least one other memory node.

12. The method of claim 9, wherein the source memory vector is located on the responding memory node, the method further comprising retrieving the data elements from the destination memory array via an internal memory load operation.

13. The method of claim 9, wherein the source memory vector is located on the requesting memory node, the method further comprising retrieving the data elements from the source memory vector by transmitting a read request message to the requesting memory node.

14. The method of claim 13, wherein the responding memory node transmits the scatter response message to the requesting memory node on a condition that the responding memory node receives a read response message from the requesting memory node, and stores the data elements in the destination array.

15. The method of claim 9, wherein the source vector is located on a third memory node, the method further comprising retrieving the data elements from the source memory vector by transmitting a read request message to the third memory node.

16. The method of claim 15, wherein the responding memory node transmits the scatter response message to the requesting memory node on a condition that the responding memory node receives a read response message from the third memory node and stores the data elements in the destination array.

17. A responding memory node, comprising:
   a communications interface comprising circuitry configured to communicate with at least one other memory node; and
   a first memory controller;
   the controller comprising circuitry configured to:
      receive, by the first memory controller, a request message from a requesting node which includes a second memory controller and a second communications interface, via the communications interface over a memory network from the second communications interface, the request message instructing the responding memory node to retrieve data elements from a source memory data structure and store the data elements to a destination memory data structure;
      retrieve the data element from the source memory data structure;
      store the data elements to the destination memory data structure; and
      transmit, by the first memory controller, a response message to the second memory controller of the requesting node via the communications interface, the response message indicating that the data elements have been stored into the destination memory data structure.

18. The responding memory node of claim 17, further comprising circuitry configured to retrieve the data elements from non-contiguous locations in the source memory data structure and to store the data elements to contiguous locations in the destination memory data structure.

19. The responding memory node of claim 17, further comprising circuitry configured to retrieve the data elements from contiguous locations in the source memory data structure and to store the data elements to non-contiguous locations in the destination memory data structure.

20. The responding memory node of claim 17, further comprising circuitry configured to retrieve data elements from non-contiguous locations of the source data structure or to store the data elements to non-contiguous locations of the destination data structure according to pattern information in the request message.

* * * * *